US009924567B2

(12) United States Patent
Ignatowski et al.

(10) Patent No.: US 9,924,567 B2
(45) Date of Patent: Mar. 20, 2018

(54) INDUCTION COIL WITH DYNAMICALLY VARIABLE COIL GEOMETRY

(71) Applicant: Thermatool Corp., East Haven, CT (US)

(72) Inventors: Thomas Ignatowski, Orange, CT (US); Michael A. Nallen, Hampden, MA (US)

(73) Assignee: THERMATOOL CORP., East Haven, CT (US)

( * ) Notice: Subject to any disclaimer, the term of this patent is extended or adjusted under 35 U.S.C. 154(b) by 528 days.

(21) Appl. No.: 14/276,596

(22) Filed: May 13, 2014

(65) Prior Publication Data

US 2014/0339219 A1 Nov. 20, 2014

Related U.S. Application Data

(60) Provisional application No. 61/823,035, filed on May 14, 2013.

(51) Int. Cl.
*H05B 6/42* (2006.01)
*H05B 6/36* (2006.01)
*B23K 13/02* (2006.01)
*H05B 6/10* (2006.01)

(52) U.S. Cl.
CPC ............... *H05B 6/36* (2013.01); *H05B 6/104* (2013.01); *H05B 6/42* (2013.01)

(58) Field of Classification Search
CPC ............. H05B 6/36; H05B 6/42; H05B 6/104
USPC ....... 219/617, 674, 677, 660, 645, 667, 670, 219/610, 612, 614, 659, 67
See application file for complete search history.

(56) References Cited

U.S. PATENT DOCUMENTS

| | | | | |
|---|---|---|---|---|
| 2,933,584 A | | 4/1960 | Thielsch | |
| 3,037,105 A | * | 5/1962 | Kohler | B23K 13/02 219/612 |
| 3,414,697 A | * | 12/1968 | Rudd | B23K 13/02 219/614 |
| 3,607,138 A | | 9/1971 | Keller | |
| 4,119,825 A | | 10/1978 | Taylor et al. | |
| 4,701,584 A | | 10/1987 | Rylicki | |
| 5,641,422 A | | 6/1997 | Matsen et al. | |
| 6,107,613 A | | 8/2000 | Welch et al. | |

FOREIGN PATENT DOCUMENTS

| | | | |
|---|---|---|---|
| DE | 1015157 | B | 9/1957 |
| JP | 11-287832 | A | 10/1999 |
| JP | 2000-003778 | A | 1/2000 |
| JP | 2005-325409 | A | 11/2005 |
| KR | 1020050033392 | A | 4/2005 |
| KR | 10-0897005 | B1 | 5/2009 |

* cited by examiner

*Primary Examiner* — Quang Van
(74) *Attorney, Agent, or Firm* — Philip O. Post

(57) ABSTRACT

A solenoidal induction coil with dynamically variable coil geometry is provided for inductively welding or heating continuous or discontinuous workpieces passing through the solenoidal induction coil in a process line. The coil geometry can change, for example, as the outer dimension of the workpiece passing through the solenoidal induction coil changes or as non-continuous workpieces pass through the solenoidal induction coil in an induction heating or welding process line.

20 Claims, 4 Drawing Sheets

INDUCTION COIL WITH DYNAMICALLY VARIABLE COIL GEOMETRY

CROSS REFERENCE TO RELATED APPLICATIONS

This application claims the benefit of U.S. Provisional Application No. 61/823,035, filed May 14, 2013, hereby incorporated by reference in its entirety.

FIELD OF THE INVENTION

The present invention generally relates to electric induction welding or heating of a workpiece within a solenoidal type induction coil, and in particular to such induction welding or heating where the outer dimensions of the workpiece can vary and the coil geometry of the induction coil can be dynamically changed to accommodate the dimensional changes of the workpiece.

BACKGROUND OF THE INVENTION

Workpieces can pass through solenoidal type induction coils to induction weld or heat the workpieces. Coils of a fixed geometry can efficiently weld or heat only workpieces of a limited range of dimensions.

It is one object of the present invention to provide apparatus and method for electric induction welding or heating of workpieces passing through a solenoidal type coil so that when a dimension of the workpiece changes, the welding or heating process can continue at normal or reduced process line speed without interruption of electric power to the solenoidal induction coil and flow of a cooling medium to the solenoidal coil.

BRIEF SUMMARY OF THE INVENTION

In one aspect the present invention is an apparatus for, and method of electric induction welding or heating of a workpiece by passing the workpiece through at least one turn of a solenoidal induction coil. The induction coil has a dynamically variable coil geometry that can change as a dimension or property of the workpiece changes. Variable coil geometry is accomplished by including an adjustable coil segment assembly or an articulating member that forms or is attached to a part of one or more turns of the solenoidal induction coil.

In some examples of the invention the variable coil geometry is achieved by changing the interior cross sectional dimension of the solenoidal induction coil responsive to a change in the exterior dimensions of a workpiece passing through the solenoidal induction coil.

The above and other aspects of the invention are set forth in this specification and the appended claims.

BRIEF DESCRIPTION OF THE DRAWINGS

The figures, in conjunction with the specification and claims, illustrate one or more non-limiting modes of practicing the invention. The invention is not limited to the illustrated layout and content of the drawings.

FIG. 1(*b*) is a diagrammatic cross section of the solenoidal induction coil in FIG. 1(*a*) with the adjustable coil segment in a variable opened-segments position.

FIG. 2(*b*) is a diagrammatic cross section of the solenoidal induction coil in FIG. 2(*a*) with the adjustable coil segment in a variable opened-segments position.

FIG. 3(*b*) is a diagrammatic cross section of one embodiment of a solenoidal induction coil turn with dynamically variable coil geometry of the present invention used in the forge welding process shown in FIG. 3(*a*) with an adjustable coil segment in the closed-segments position.

FIG. 3(*c*) is a diagrammatic cross section of the solenoidal induction coil in FIG. 3(*b*) with the adjustable coil segment in a variable opened-segments position.

DETAILED DESCRIPTION OF THE INVENTION

Figure 1A:
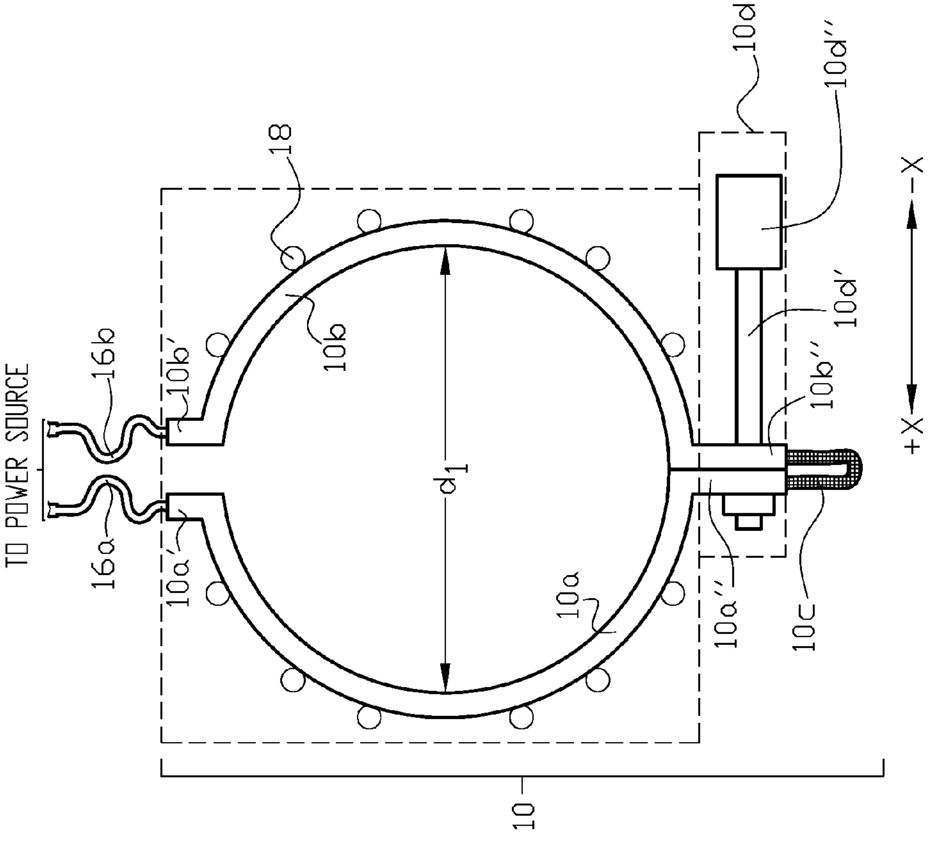
FIG. 1(*a*) is a diagrammatic cross section of one embodiment of a solenoidal induction coil with dynamically variable coil geometry of the present invention with an adjustable coil segment in the closed position.
Figure 1B:
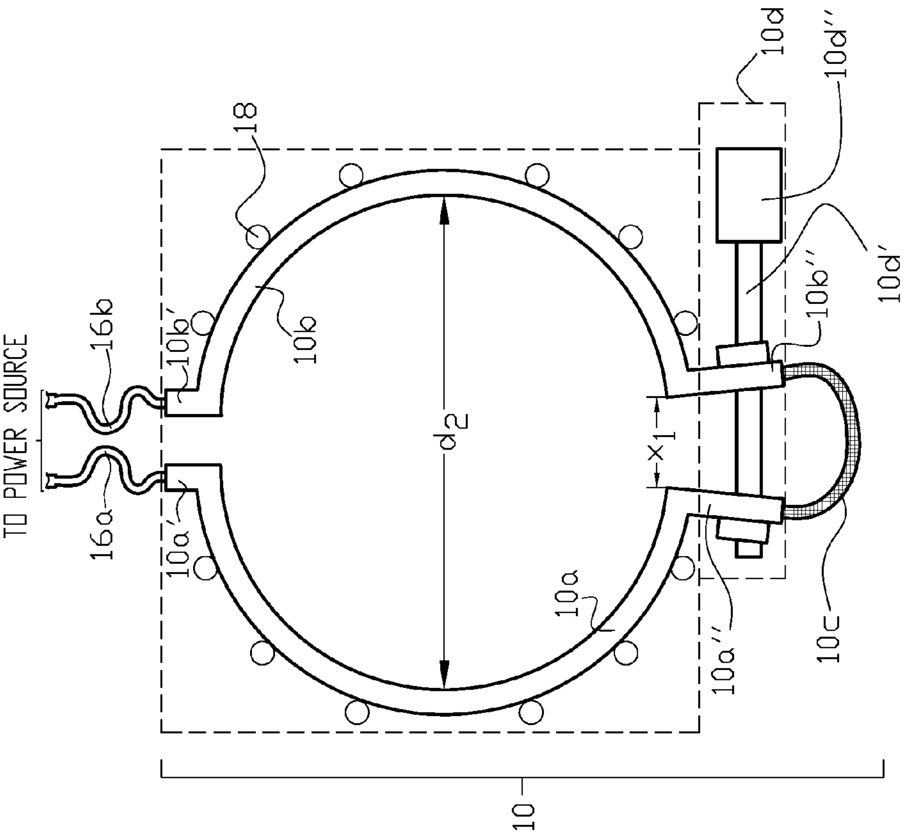

One example of a solenoidal induction coil 10 with dynamically variable coil geometry is shown in diagrammatic cross section in FIG. 1(*a*) and FIG. 1(*b*). Induction coil 10 is at least a one turn solenoidal coil comprising fixed electrically conductive coil segments 10*a* and 10*b* and one or more adjustable coil segments 10*c*, with each adjustable coil segment associated with a separate adjustable coil segment assembly 10*d*.

Coil segments 10*a* and 10*b* are fixedly secured either at least partially along the lengths of their coil segments, or by elements connected to the coil segments. For example, at least the power termination ends 10*a*' and 10*b*' of coil segments 10*a* and 10*b* can be fixedly secured adjacent to each other as shown in the figures with space between the power terminations to provide electrical isolation between the power termination ends. The space may be filled with an electrical insulating material such as polytetrafluoroethylene or other suitable material. Alternatively a flexible joint in the electrical supply circuit to the solenoidal coil can be provided, for example, by flexible (continuous flex) cable segments 16*a* and 16*b* that connect the opposing end power termination ends 10*a*' and 10*b*' of solenoidal induction coil 10 to one or more power sources not shown in the figures. In this embodiment of the invention the flexible cable segments 16*a* and 16*b* allow flexing apart of rigid coil segments 10*a* and 10*b* from the closed-segments position to a variable opened-segments position as further described below.

Coil segments 10*a* and 10*b* may be of equal segment lengths as shown in the figures, or of unequal lengths depending upon a particular application. In the figures, equal-length coil segments 10*a* and 10*b* are each semicircular. In this example, adjustable coil segment ends 10*a*" and 10*b*" are opposite power termination ends 10*a*' and 10*b*' for coil segments 10*a* and 10*b*, respectively. In this example, adjustable coil segment 10*c* is attached to adjustable coil segment ends 10*a*" and 10*b*" to electrically interconnect coil segments 10*a* and 10*b* at the adjustable coil segment ends.

An adjustable coil segment assembly 10*d* comprises an adjustable coil segments separator 10*d*' for providing an adjustable coil segment ends distance between the adjustable coil segment ends 10$a$" and 10$b$" and actuator 10$d$" that dynamically moves separator 10$d$' to vary the solenoidal coil geometry, which in this example is the interior cross sectional dimension of the solenoidal coil. Alternatively separator 10$d$' may be manually adjusted without an actuator. In this example, actuator 10$d$" enables the adjustable coil segment ends 10$a$" and 10$b$" of the electrically conductive coil segments 10$a$ and 10$b$ to be joined together (closed-segments position) or separated apart (variable opened-segments position) as shown respectively in FIG. 1($a$) and FIG. 1($b$) so that the interior cross sectional dimension (in this example, an inner diameter) of solenoidal coil 10 can vary between a minimum of $d_1$ in the closed-segments position shown in FIG. 1($a$) and a maximum of $d_2$ in a maximum variable opened-segments position shown in FIG. 1($b$) to accommodate workpieces of different exterior dimensions within the solenoidal coil. Actuator 10$d$" can vary the interior cross sectional dimension anywhere within the range of minimum dimension $d_1$ to maximum dimension $d_2$ depending upon the workpiece passing through the solenoidal coil.

The fixed electrically conductive coil segments (10$a$ and 10$b$) and the adjustable coil segment 10$c$ form a series electrical circuit around a workpiece inserted within the solenoidal coil. In this example, when the solenoidal coil is in the closed-segments position, the adjustable coil segment 10$c$, as shown in FIG. 1($a$), is shorted out of the series electrical circuit since the opposing adjustable coil segment ends 10$a$" and 10$b$" are in electrical contact (continuity) with each other. In this example, when the solenoidal coil is in a variable opened-segments position, the adjustable coil segment 10$c$, as shown in FIG. 1($b$), provides electrical continuity between coil segments 10$a$ and 10$b$.

The fixed electrically conductive coil segments (10$a$ and 10$b$) and the adjustable coil segment 10$c$ (when in a variable opened-segments position) serve as the solenoidal coil conductors for alternating current (AC current) at a frequency or frequencies suitable for an electric induction welding application or electric induction heating of a workpiece positioned within the solenoidal coil.

In other embodiments of the invention, the adjustable coil segment can be inserted serially at any position around a solenoidal induction coil, for example between a first solenoidal coil adjustable termination (also referred to as a first coil turn end) and a second solenoidal coil adjustable termination (also referred to as a second coil turn end) depending upon a particular application, and as may be necessary, for example, to minimize changes in inductance and impedance between the closed-coil position when the first and second solenoidal coil adjustable terminations are adjacent and connected electrically to short circuit the adjustable coil segment and a variable opened-segments position when the adjustable coil segment provides electrical continuity between the first and second solenoidal coil adjustable terminations. In these embodiments an adjustable coil segment assembly can also be used as described for other examples of the invention.

In some embodiments of the invention, the fixed electrically conductive coil segments 10$a$ and 10$b$ can be formed, for example, from copper tubing or sheets with sufficient bending elasticity to flex at the opposing adjustable coil segment ends 10$a$" and 10$b$" of the fixed electrically conductive coil segments so that the electrically conductive coil segments are moved between a variable opened-segments position and the closed-segments position by the adjustable coil segment assembly 10$d$.

Adjustable coil segment 10$c$ can be, for example, a flexible braided electrical conductor (such as copper) or telescoping electrical conductors (such as concentric telescoping copper tubes).

Adjustable coil segments separator 10$d$' can be a component that moves either adjustable coil segment end 10$a$" or 10$b$", or both adjustable coil segment ends. For example, separator 10$d$' may be a rod fixed to (but electrically isolated from) adjustable coil segment end 10$a$" and passing through an electrically isolated hole in adjustable coil segment end 10$b$" so that when (in this example, linear) actuator 10$d$" moves the rod in the plus or minus X directions, adjustable coil segment end 10$a$" moves in the same direction while adjustable coil segment end 10$b$" remains stationary. Alternatively separator 10$d$' may be a threaded rod passing through electrically isolated screw thread openings in adjustable coil segment ends 10$a$" and 10$b$" so that when actuator 10$d$" rotates the thread rod the adjustable coil segment ends 10$a$" and 10$b$" move in opposite plus and minus X directions to separate or join together the adjustable coil segment ends. Actuator 10$d$" can be selected based on a particular application, for example, the actuator may be a hydraulic or electrically operated linear or ball screw drive, for opening and closing the distance $x_1$ between opposing ends 10$a$" and 10$b$" of coil segments 10$a$ and 10$b$.

In other examples of the invention, a solenoidal coil of the present invention moves (articulates) between the closed-segments position and the variable opened-segments position by means of a non-flexible, rigid member such as, but not limited to, a sliding contact, busbar or other electrically conductive and rigid element in, or adjacent to, the location of adjustable coil segment 10$c$ in FIG. 1($a$) and FIG. 1($b$). For example in FIG. 2($a$) and FIG. 2($b$) fixed busbar 10$c$' is arranged to be in contact with first and second adjustable coil segment ends, 10$a$" and 10$b$" in FIG. 2($a$) and FIG. 2($b$) so that the first and second adjustable coil segment ends maintain electrical contact with fixed busbar 10$c$' as adjustable coil segment assembly 10$d$ dynamically varies the interior cross sectional opening of the solenoidal induction coil between the closed-segments position and a variable opened-segments position.

In other embodiments of the invention multiple adjustable coil segments and adjustable coil segment assemblies may be distributed between multiple fixed coil segments of the solenoidal induction coil to dynamically change the interior cross sectional opening of the coil without putting stress on flexible cable segments 16$a$ and 16$b$ or other types of electric power leads, or to accommodate other dimensional changes in a workpiece passing through the solenoidal induction coil.

The adjustable coil segment assembly 10$d$ provides a means for changing the interior cross sectional area of a coil fed by one set of power leads 16$a$ and 16$b$ to accommodate various sizes of workpieces. For example if the workpiece passing through the coil is a longitudinally oriented continuous tubular article, or the opposing edges of a strip material rolled and butted together for induction forge welding, where the exterior cross sectional diameter of the workpiece changes, the distance $x_1$ can be changed to accommodate the change in cross sectional diameter. This can occur, for example, on continuous strip process lines where the strip material is continuously supplied from consecutive coils of different width strip material that are butt-welded together at their ends, or discontinuous strip process lines where there is an interruption due to the change over to a new separate coil of strip material when the existing process coil reaches its end.

Figure 3A:
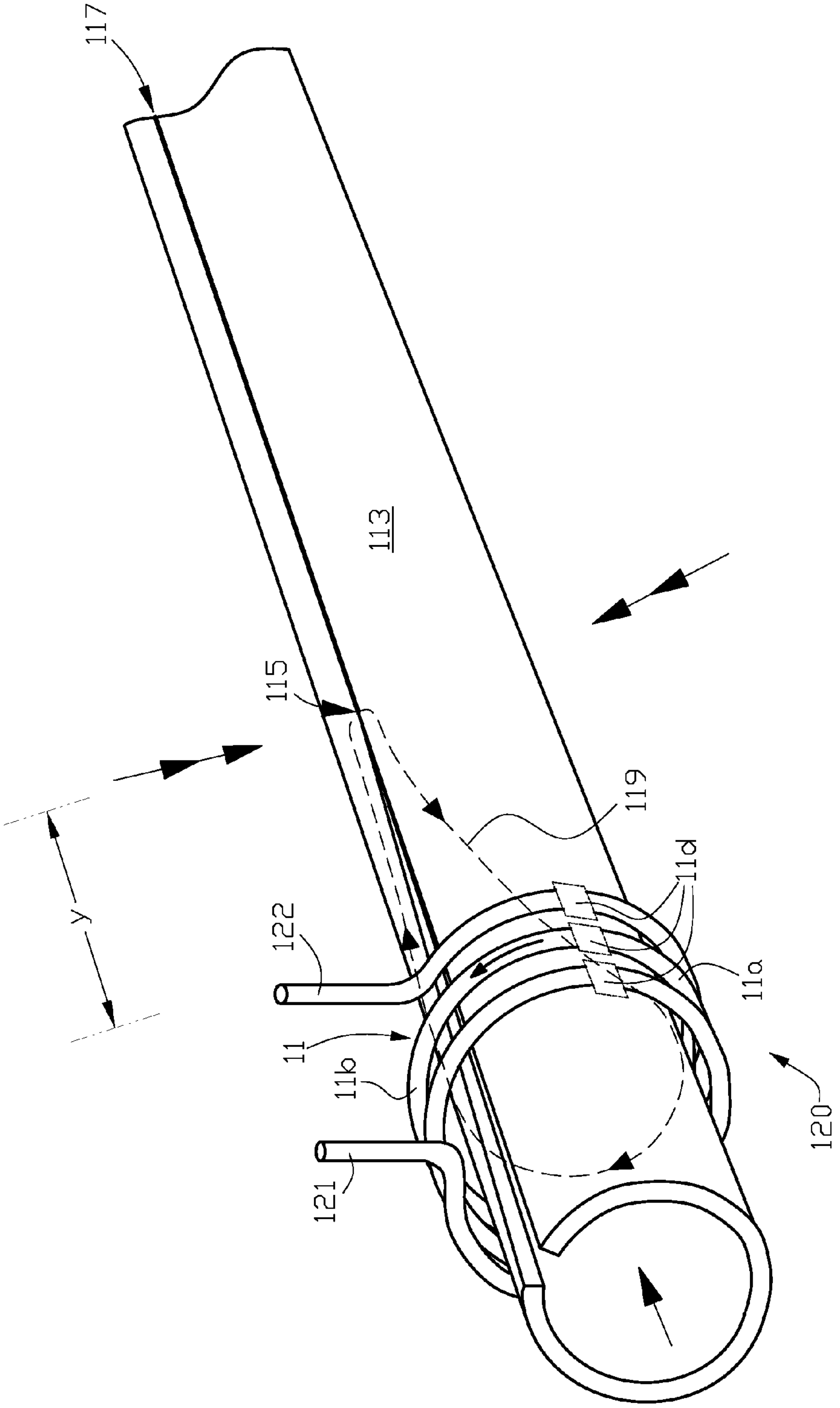
FIG. 3(*a*) illustrates typical formation of a continuous tubular article by forge welding together opposing longitudinal edges of a metal plate or strip with a solenoidal induction coil of the present invention.
Figure 3B:
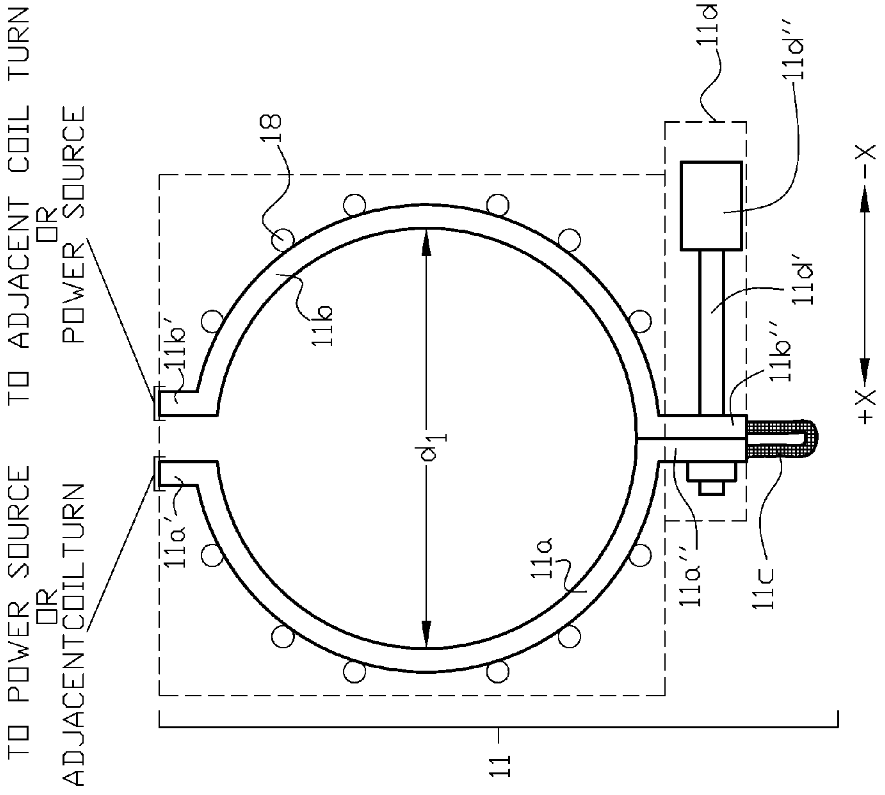
Figure 3C:
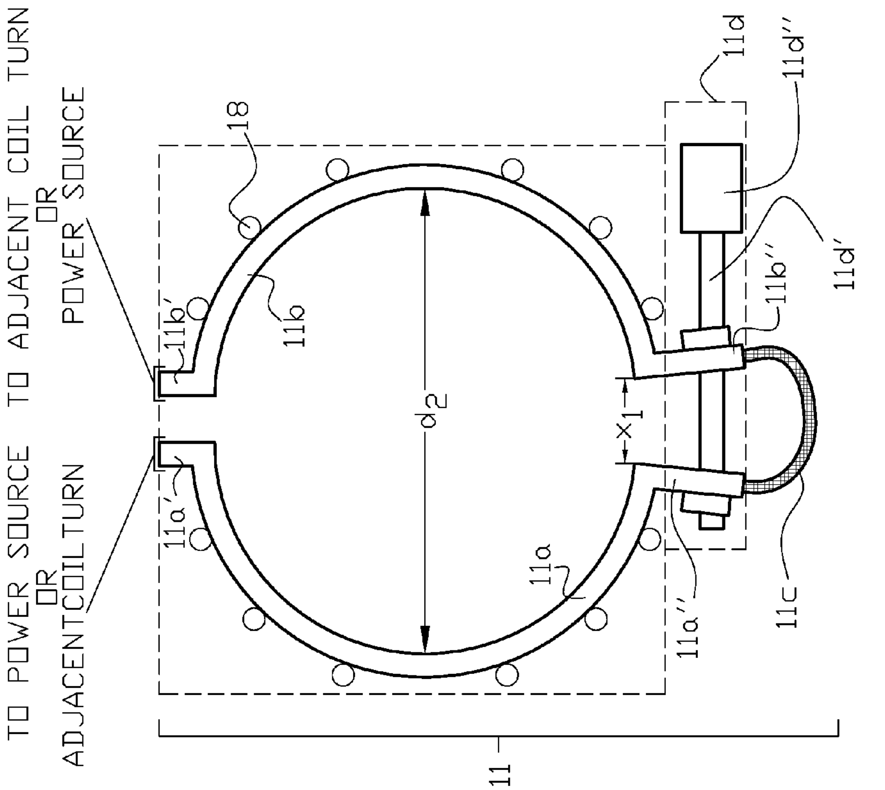

For example in FIG. 3(*a*), tube 113 is formed from a metal strip forced together at weld point 115 to form weld seam 117 as the strip advances in the direction of the single headed arrow and pressure force is applied in the directions indicated by the double headed arrows to force the edge portions of the rolled strip together. In FIG. 3(*a*) induction power can be supplied from a suitable ac power source (not shown in the figure) to induction coil power terminals 121 and 122 of induction coil 120 to induce current in the metal around a "V" shaped region formed by forcing edges of the strip together. The induced current flows around the outside of the tube and then along the open "V" shaped edges to weld point 115 as illustrated by the typical current path line 119 (shown as dashed line) in FIG. 3(*a*). The length, y, of this "V" shaped region is approximately equal to the distance between the end of the coil closest to the weld point. In FIG. 3(*a*) induction coil 120 consists of three coil turns, each of which coil turn 11 contains an adjustable coil segment assembly 11*d*; which can be similar to any adjustable coil segment and adjustable coil segment assembly described herein, and coil turn 11 is similar to solenoidal induction coil 10 except that each coil turn 11 is either connected to the adjacent coil turn 11 or induction coil power terminals 121 and 122 at the opposing ends of coil 120 as illustrated in FIG. 3(*b*) and FIG. 3(*c*). In this embodiment adjustable coil segment assemblies are shown in FIG. 3(*a*) in the three o'clock position, but as with other examples of the invention, the adjustable coil segment assemblies may be located anywhere around the circumference of the solenoidal induction coil.

Depending upon the interior cross sectional area of the induction coil and/or the magnitude of electric power or voltage applied to the induction coil, two or more adjustable coil segment assemblies with an adjustable coil segment may be distributed around the circumference of one or more turns of the induction coil in series with fixed electrically conductive coil segments in quantity as required by the number of adjustable coil segment assemblies.

In some examples of the invention, a spatially adjustable capacitor assembly may optionally be provided in parallel with an adjustable coil segment assembly so that an adjustable capacitive element controlled by the spatially adjustable capacitor assembly provides a variable capacitance as the adjustable capacitive element transitions between the closed-segments position to the variable opened-segments position with/or without the adjustable coil segment.

Dynamic variable change in the interior cross sectional area of a solenoidal induction coil of the present invention can be provided by one or more sensing means that sense a change in the geometry of a workpiece prior to passing the workpiece through the solenoidal induction coil. For example if the feed workpiece is a strip having a width, w, that is rolled forge welded into a pipe as shown, for example, in FIG. 3(*a*), one or more strip sensor(s) can be provided. The one or more strip sensors may be non-contact sensors, such as a laser beam aimed at the strip edge so that a change in the width of the strip prior to roll forming (and therefore a change in the outer dimension of the rolled pipe) can be sensed; alternatively the one or more strip sensors may be a contact sensor making contact with a strip edge prior to roll forming to sense a change in the width of the strip. In another example of the present invention, if the feed workpiece to a solenoidal coil of the present invention is a non-continuous strip of constant width, the one or more strip sensors can be arranged to detect the end of the non-continuous strip currently being inductively heated to initiate a change in the interior cross sectional dimension of a solenoidal induction coil of the present invention as the trailing end of the non-continuous strip approaches entry to the solenoidal induction coil. The change in width, outer cross sectional dimension or end termination of the workpiece can be inputted to an actuator control system for an actuator used in the present invention for adjustment of distance $x_1$. Alternatively the change in dimension of a workpiece to be a full-body workpiece heated by induction can be detected or programmed into a programmable logic controller or computer program for input to the control actuator system to allow even heating of upset ends of a tube or pipe passing through the solenoidal induction coil where the upset pipe end has, for example, either a thicker wall or larger outside diameter, or both, compared to the pipe body between the upset pipe ends, by varying the interior cross sectional opening of the solenoidal induction coil at the upset pipe end. Alternatively control of the actuator can be manual, or selectably manual or automatic, in all examples of the invention.

Figure 2A:
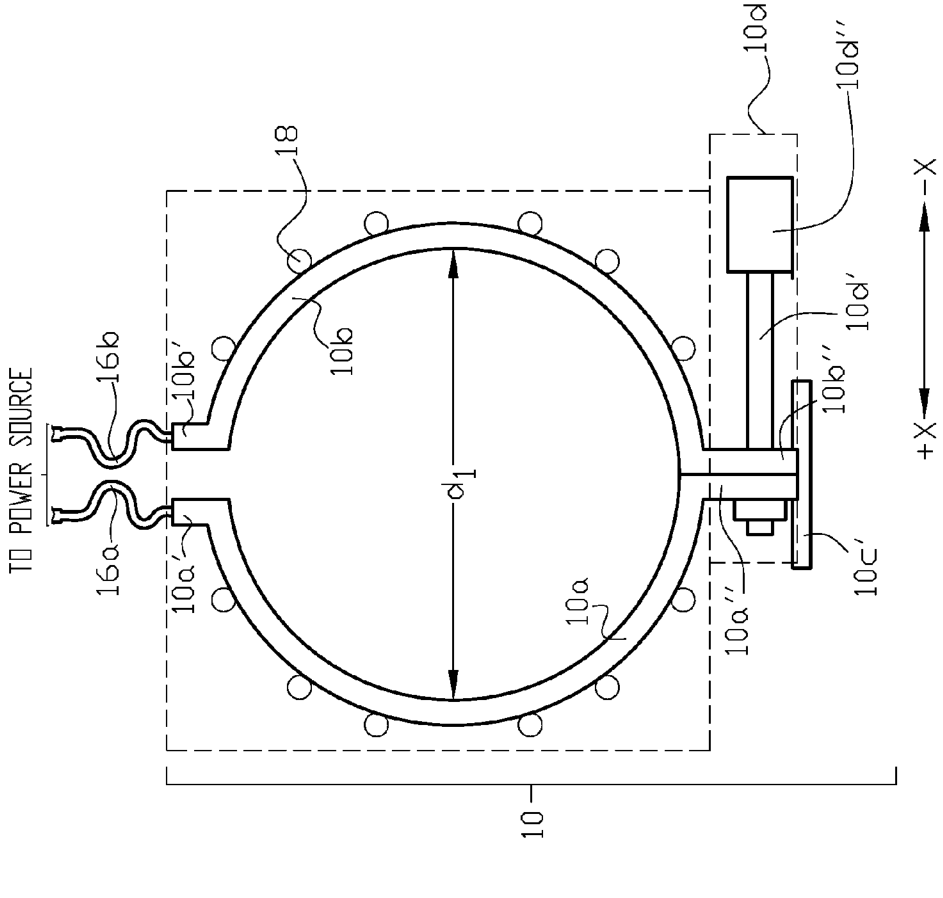
FIG. 2(*a*) is a diagrammatic cross section of another embodiment of a solenoidal induction coil with dynamically variable coil geometry of the present invention with an adjustable coil segment in the closed-segments position.
Figure 2B:
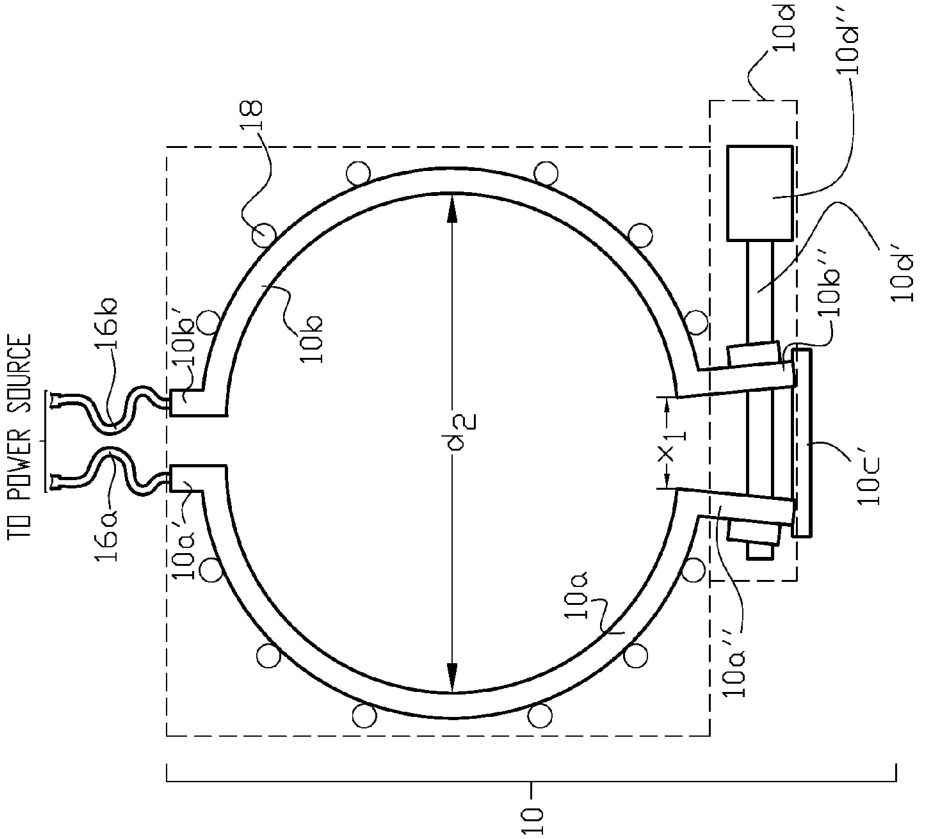

Forced circulatory cooling of coil 10 can be accomplished, for example, with cooling tubes or cavities 18 in thermal heat transfer contact with fixed electrically conductive coil segments, such as segments 10*a* and 10*b* in FIG. 1(*a*) through FIG. 2(*b*), and a cooling fluid flowing within the tubes or cavities. If necessary forced circulatory cooling of an adjustable coil segment can be accomplished. For example in FIG. 1(*a*) and FIG. 1(*b*) cooling tubes can be weaved with copper mesh conductors making up the adjustable coil segment electrical conductor 10*c*, or within telescoping tubular electrical conductors or fixed busbar 10*c*' making up the adjustable coil segment electrical conductor in FIG. 2(*a*) and FIG. 2(*b*). With this arrangement of cooling apparatus, the interior cross sectional dimension of a solenoidal induction coil of the present invention can be adjusted without disconnection of cooling lines to the coil or limiting coolant flow through the cooling tubes or cavities.

In the above examples of the invention actuator 10*d*" is electrically isolated from the solenoidal coil circuit so that current flows through flexible adjustable coil segment 10*c* in FIG. 1(*b*), rigid adjustable coil segment 10*c*' in FIG. 2(*b*), and flexible adjustable coil segment 11*c* in FIG. 3(*c*). Actuator 10*d*" is constructed of material such that it can withstand heat and other environmental conditions when the solenoidal induction coil is in a closed-segments position or a variable opened-segments position.

In the above examples of the invention coil segments separators 10*d*' and 11*d*' are electrically isolated from the first and second adjustable coil segment ends. In other embodiments of the invention the coil segments separator may also function as the adjustable coil segment electrically connecting the first and second adjustable coil segment ends while being electrically isolated from actuator 10*d*". In this embodiment, adjustable coil segment 10*c*, 10*c*' or 11*c* is not required since the coil segments separator functions both as the separating means between the first and the second adjustable coil segment ends (or the first and second solenoidal coil adjustable terminations, or the first and second coil turn ends) and the electrical conductor maintaining electrical continuity between the first and second adjustable coil segment ends (or the first and second solenoidal coil adjustable terminations, or the first and second coil turn ends).

Where some of the above examples of the invention describe a single turn solenoidal induction coil, the features of the invention in a single-turn solenoidal induction coil may be used in each coil turn comprising a multiple turn solenoidal induction coil.

Reference throughout this specification to "one example or embodiment," "an example or embodiment," "one or more examples or embodiments," or "different examples or embodiments," for example, means that a particular feature may be included in the practice of the invention. In the description, various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. A solenoidal induction coil with a dynamically variable interior cross sectional opening comprising:

a first coil segment and a second coil segment, the first coil segment having a first power termination end and a first adjustable coil segment end opposing the first power termination end, the second coil segment having a second power termination end and a second adjustable coil segment end opposing the second power termination end, the first power termination end and the second power termination end fixedly secured adjacent to each other and electrically separated from each other, the opposing first and second adjustable coil segment ends movably located next to each other in a closed-segments position to form an electrically continuous connection between the opposing first and second adjustable coil segment ends;

an adjustable coil segment electrically connecting the opposing first and second adjustable coil segment ends, the adjustable coil segment formed from a flexible electrical conductor or a telescoping electrical conductor; and an adjustable coil segment assembly comprising a coil segments separator for providing an adjustable coil segment ends distance between the opposing first and second adjustable coil segment ends, and an actuator for a dynamic adjustment of the adjustable coil segment ends distance whereby the interior cross sectional opening of the solenoidal induction coil is dynamically varied between the closed-segments position when the adjustable coil segment is short circuited and a variable opened-segments position when the adjustable coil segment forms an electrically continuous connection between the opposing first and second adjustable coil segment ends.

2. The solenoidal induction coil of claim 1 where the first and the second power termination ends are fixedly secured adjacent to each other by a first and a second flexible coil segment respectively connected to the first and the second power termination ends of the first and second coil segments.

3. The solenoidal induction coil of claim 1 where the first and second power termination ends fixedly secured adjacent to each other at the first and second power termination ends of the first and second coil segments are formed from a flexible composition to allow the interior cross sectional opening of the solenoidal induction coil to vary between the closed-segments position and the variable opened-segments position.

4. The solenoidal induction coil of claim 1 wherein the coil segments separator comprises a separator rod, the separator rod connected at a first separator rod end to the first adjustable coil segment end by an electrically isolated fitting, the separator rod passing through an electrically isolated hole in the second adjustable coil segment end and connected to a linear output of the actuator to move the first adjustable coil segment end relative to the second adjustable coil segment end.

5. The solenoidal induction coil of claim 1 wherein the coil segments separator comprises a threaded rod, the threaded rod connected respectively to the first and the second adjustable coil segment ends by an electrically isolated first and second threaded connections and at a threaded rod end to a rotational output of the actuator to move the first and second adjustable coil segment ends relative to each other.

6. The solenoidal induction coil of claim 1 wherein the adjustable coil segment further comprises an adjustable capacitive element in parallel with the adjustable coil segment, the adjustable capacitive element controlled by a spatially adjustable capacitor assembly.

7. The solenoidal induction coil of claim 1 further comprising one or more fixed cooling conduits in thermal heat transfer contact with at least one of the first or the second coil segments for flowing a cooling medium through the one or more fixed cooling conduits.

8. The solenoidal induction coil of claim 7 further comprising one or more adjustable coil segment conduits in thermal heat transfer contact with the adjustable coil segment.

9. The solenoidal induction coil of claim 1 further comprising:

at least one sensor for sensing a workpiece geometry change or a workpiece property change of a workpiece prior to inserting the workpiece into the interior cross sectional opening; and an actuator controller for receiving the workpiece geometry change or the workpiece property change and transmitting the dynamic adjustment to the actuator.

10. A method of dynamically varying the interior cross sectional opening of the solenoidal induction coil of claim 1, the method comprising varying the interior cross sectional opening of the solenoidal induction between the closed-segments position and the variable opened-segments position by dynamic adjustment of the adjustable coil segment end distance with the actuator.

11. The method of claim 10, further comprising sensing a workpiece geometry change or a workpiece property change of a workpiece prior to the workpiece passing through the interior cross sectional opening, and the step of varying the interior cross sectional opening is responsive to the workpiece dimensional change or the workpiece property change.

12. The method of claim 11 wherein the workpiece geometry change comprises a change in a width of the workpiece.

13. The method of claim 11 wherein the workpiece geometry change comprises a trailing workpiece end of the workpiece when the workpiece is a non-continuous workpiece.

14. The method of claim 10 further comprising flowing a cooling medium through one or more cooling conduits fixed in a thermal heat transfer contact with at least one of the first coil segment or the second coil segment.

15. A solenoidal induction coil with a dynamically variable interior cross sectional opening comprising:

a first coil segment and a second coil segment, the first coil segment having a first power termination end and a first adjustable coil segment end opposing the first power termination end, the second coil segment having a second power termination end and a second adjustable coil segment end opposing the second power termination end, the first power termination end and the second power termination end fixedly secured adjacent to each other and electrically separated from each other, the opposing first and second adjustable coil segment ends movably located next to each other in a closed-segments position to form an electrically continuous connection between the opposing first and second adjustable coil segment ends; and an at least one adjustable coil segment assembly comprising:

a coil segments separator for providing an adjustable coil segment ends distance between the opposing first and second adjustable coil segment ends, the coil segments separator comprising a flexible electrical conductor or a telescoping electrical conductor between the first adjustable coil segment end and the second adjustable coil segment end; and an actuator for dynamically adjusting the adjustable coil segment ends distance whereby the interior cross sectional opening of the solenoidal induction coil is dynamically varied between the closed-segments position when the coil segments separator is short circuited and a variable opened-segments position when the coil segments separator forms an electrically continuous connection between the opposing first and second adjustable coil segment ends.

16. A solenoidal induction coil with a dynamically variable interior cross sectional opening, the solenoidal induction coil having a first and a second power source termination, the solenoidal induction coil comprising:

an at least one adjustable coil segment inserted serially within the solenoidal coil between a first and a second solenoidal coil adjustable terminations, the at least one adjustable coil segment comprising a flexible conductor or a telescoping electrical conductors; and an adjustable coil segment assembly for each of the at least one adjustable coil segment, the adjustable coil segment assembly comprising:

a coil segments separator for providing an adjustable coil segment ends distance between the first and the second solenoidal coil adjustable terminations; and an actuator for dynamically adjusting the adjustable coil segment ends distance whereby the interior cross sectional opening of the solenoidal induction coil is dynamically varied between the closed-segments position when the adjustable coil segment is short circuited and a variable opened-segments position when the adjustable coil segment forms an electrically continuous connection between the first and second solenoidal coil adjustable terminations.

17. A solenoidal induction coil with a dynamically variable interior cross sectional opening, the solenoidal induction coil having a first and a second power source termination, the solenoidal induction coil comprising:

a plurality of separate fixed coil segments joined together by a separate adjustable coil segment between each of the plurality of separate fixed coil segments, each of the separate fixed coil segments comprising a flexible conductor or a telescoping electrical conductor; and a separate adjustable coil segment assembly for each separate adjustable coil segment, the separate adjustable coil segment assembly comprising:

a coil segments separator for providing an adjustable coil segment ends distance between a first and a second fixed coil segments of the plurality of separate fixed coil segments joined by the coil segments separator; and an actuator for dynamically adjusting the adjustable coil segment ends distance whereby the interior cross sectional opening of the solenoidal induction coil is dynamically varied between a closed-segments position when the separate adjustable coil segment is short circuited and a variable opened-segments position when the adjustable coil segment forms an electrically continuous connection between the first and the second fixed coil segments of the plurality of separate fixed coil segments joined by the coil segments separator.

18. The solenoidal induction coil of claim 17 wherein the coil segments separator comprises a separator rod connected between the two fixed coil segments and electrically isolated from the first and the second fixed coil segments and connected to a linear output of the actuator to move the two fixed coil segments relative to each other.

19. The solenoidal induction coil of claim 17 wherein at least one of the separate adjustable coil segments further comprises an adjustable capacitive element in parallel with the at least one of the separate adjustable coil segments, the adjustable capacitive element controlled by a spatially adjustable capacitor assembly.

20. The solenoidal induction coil of claim 17 further comprising one or more fixed cooling conduits in thermal heat transfer contact with at least one of the plurality of separate fixed coil segments for flowing a cooling medium through the one or more fixed cooling conduits.

* * * * *